United States Patent [19]

Augustyniak

[11] Patent Number: 4,684,462
[45] Date of Patent: Aug. 4, 1987

[54] FILTRATION, AERATION, AND WATER LEVEL CONTROL MEANS FOR AQUARIUMS

[76] Inventor: George E. Augustyniak, 4928 31st Pl., Cicero, Ill. 60650

[21] Appl. No.: 874,438

[22] Filed: Jun. 16, 1986

[51] Int. Cl.$^4$ .............................................. A01K 63/00
[52] U.S. Cl. ...................................... 210/97; 210/169; 210/416.2; 210/248; 119/5
[58] Field of Search ................. 210/169, 97, 109, 110, 210/248, 255, 409, 416.2; 119/5

[56] References Cited

U.S. PATENT DOCUMENTS

| | | | |
|---|---|---|---|
| 2,737,490 | 3/1956 | Lambertson | 210/169 |
| 3,135,238 | 6/1964 | Eyl | 210/169 |
| 3,261,471 | 7/1966 | Halpert | 210/169 |
| 3,273,717 | 9/1966 | Canterbury | 210/409 |
| 3,321,082 | 5/1967 | Willinger | 210/169 |
| 3,485,373 | 12/1969 | Powers | 119/5 |
| 3,540,593 | 11/1970 | Stewart | 210/169 |
| 3,693,798 | 9/1972 | White | 210/169 |
| 3,785,493 | 1/1974 | Harding | 210/169 |
| 3,835,813 | 9/1977 | Katz | 119/5 |
| 3,994,807 | 11/1979 | Macklem | 119/5 |
| 4,220,530 | 9/1980 | Gabriele | 210/169 |
| 4,285,813 | 8/1981 | Stewart et al. | 210/169 |
| 4,333,829 | 6/1982 | Walther | 210/169 |
| 4,615,798 | 10/1986 | O'Dougherty | 210/416.2 |

Primary Examiner—Peter Hruskoci
Assistant Examiner—Coreen Y. Lee
Attorney, Agent, or Firm—Frederick J. Krubel

[57] ABSTRACT

A portable, universally adaptable water control device for use in conjunction with any conventional aquarium and for incorporation into the recirculation water filtration and aeration system thereof for automatically maintaining a predetermined level of water in an aquarium tank and for continually removing water solely from the top surface of the water contained in the aquarium tank and filtering and aerating the same when in operation; the water control device is adapted to be supported on a wall of the aquarium tank and includes an open-topped overflow receptacle positioned within the aquarium tank, an open-topped pre-filter receptacle positioned externally of the aquarium tank having its interior divided into a water-receiving compartment and a drainage compartment by a vertical partition wall, and a siphon tube for transferring water from the bottom of the overflow receptacle to the bottom of the water-receiving chamber; the siphon tube has both of its ends at the same level which level is below the level of the top edge of the pre-filter receptacle partition wall the overflow and pre-filter receptacles each have water aeration means embodied therein and each receptacle may also have filtration means incorporated therein.

Manually operable means are provided for adjusting the vertical position of the overflow receptacle with respect to the vertical position of the pre-filter receptacle.

22 Claims, 5 Drawing Figures

FILTRATION, AERATION, AND WATER LEVEL CONTROL MEANS FOR AQUARIUMS

BACKGROUND OF THE INVENTION

This invention relates generally to apparatus for use in conjunction with aquariums and the like, and, more particularly, to a new and improved device for filtering and aerating the water contained in an aquarium tank and for constantly maintaining the water in the aquarium tank at a predetermined level.

In order to sustain aquarium marine and plant life in an optimum environment, it is essential that the water in the aquarium tank be periodically cleaned, aerated and degassed to replenish the oxygen content of the tank water. However, equally important to such achievement of an optimum environment for the marine and plant life is the maintenance of an unchanging, constant, predetermined level of water in the aquarium tank.

The problem of obtaining an optimum environment for aquarium marine and plant life has been attacked by many as evidenced by the multitude of different filtration and aeration devices proposed in the prior art for clarifying or purifying the aquarium tank water. Some forms of filter units and/or aerator means have been simple in construction while others are rather complex in nature and, thus, costly to manufacture and maintain in good working order. In fact, the utilization of certain filtration and aeration systems oftentimes requires the use of a specially-designed and constructed, and, thus, costly aquarium tank.

Generally, conventional filtration and aeration systems usually involve the continuous flow of water from the aquarium tank into filtration means and from the filtration means back into the tank. Oftentimes, the aeration means are provided in series with the filtration means or sometimes such aeration means are separate and apart from the filtration means. Furthermore, in order to conserve space within the aquarium tank and to facilitate periodic cleaning of the filter media, in many prior art arrangements or installations the filter unit is mounted on the exterior side of one of the aquarium tank walls. Means are provided for transferring water from the aquarium tank to the exteriorly-mounted filter unit and such tank water transferring means often takes the form of a conventional siphon tube. In the usual installation, the intake end of the siphon tube within the aquarium tank is disposed at or adjacent the bottom of the aquarium tank where any sediment and foreign debris tend to settle. The following United States patents disclose filtration systems wherein a filter unit is mounted on an exterior wall surface of an aquarium tank and the filter unit is supplied with water mainly from the bottom of the aquarium tank or from the mid section thereof:

U.S. Pat. No. 2,737,490, Lambertson
U.S. Pat. No. 3,135,238, Eyl
U.S. Pat. No. 3,321,082, Willinger
U.S. Pat. No. 3,273,717, Canterbury
U.S. Pat. No. 3,835,813, Katz
U.S. Pat. No. 3,693,798, White
U.S. Pat. No. 3,994,807, Macklem
U.S. Pat. No. 4,285,813, Stewart While all of the filtration systems disclosed in the above-listed prior art patents are no doubt successful to some degree in removing the sediment which has settled to the bottom of the aquarium tank, such filtration systems are obviously functionally incapable of removing the proteins, amino acids, fatty acids and other proteinaceous material which accumulate and are concetrated on the top surface layer of the water contained in the aquarium tank. If such proteinaceous materials are not removed and are allowed to accumulate and become concentrated on the top surface of the aquarium tank water, the proper exchange of gases between the aquarium tank water and the ambient air is prevented to thus adversely affect the balanced interplay of certain biological and biochemical systems necessary for achieving optimum environment for the aquarium marine and plant life. Moreover, the accumulated foreign material may actually form a foul and unsightly scum on the top surface of the aquarium tank water is not periodically removed.

Numerous attempts have been made in the past to resolve the problem of skimming the top surface of the water within the aquarium tank in order to remove foreign matter therefrom. Such attempts are exemplified in U.S. Pat. Nos. 3,785,493 to Harding and 4,333,829 to Walther. While the devices and apparatuses disclosed in these patents no doubt will achieve limited success in the removal of foreign matter from the surface of the body of water contained in the aquarium tank, such patented devices and apparatuses, however, possess certain inherent functional shortcomings which diminish their effectiveness for achieving an optimum environment for aquarium marine and plant life when utilized in an aquarium water filtering and circulating system.

As pointed out hereinbefore, the achievement of optimum environment for aquarium marine and plant life depends on many factors including the important fact that the volume of the body of water in the aquarium tank must be kept as constant as possible and such volume of water should be equal to the full capacity of the aquarium tank. Moreover, by maintaining the water level constant, the unsightly deposition of salt and calcium on the inside wall surface area of the aquarium tank is eliminated. The devices and apparatuses disclosed in the two last mentioned patents are incapable of operating to maintain the level of the water in their respective aquariums constant and unchanging and the volume of the water at or close to the full water capacity of the aquarium tank.

The vast majority of aquarium water purifying systems employ an electrically-driven water or air pump for assisting in the transfer of water from the aquarium tank into the filtering means and then from the filtering means back to the aquarium tank. In those installations employing a filter unit mounted on the exterior wall surface of the aquarium tank so that the water in the filter is at the same level as in the tank, siphon tube means are generally used to draw water from the aquarium tank and discharge the same into the filter unit. The electrically-driven pump means is effective thereafter to return the filtered water back to the aquarium tank. As the filtered water is drawn from the filter unit, it is being replaced by unfiltered water from the aquarium tank through the siphoning action of the siphoning tube means. Thus, the siphon tube means serves as an important and vital link in the overall operation of the water purifying and circulating system. If for any reason the siphoning action is lost, the entire water purifying and circulating system will become inoperative. As an example, in the event of a power failure causing the pump to cease operating, the water level in the aquarium tank could be lowered by evaporation or for other reasons to a level where the intake end of the siphon tube means is exposed to the atmosphere. Similarly, the discharge end of the siphon tube means could be exposed by gravitational draining of water from the filter unit causing abnormal lowering of the water level in the filter unit below the level of the siphon tube means. Thus, in order to place the aquarium water purifying and circulating system in operation again after power is restored, it will be necessary to manually restart the siphoning action of the siphon tube means.

SUMMARY OF THE INVENTION

Accordingly, it is a primary objective of the present invention to provide a new and improved device for use in conjunction with a conventional aquarium tank and the like for filtering and aerating the aquarium water as well as for constantly maintaining the water at a predetermined level and which device is operable to substantially obviate the foregoing and other shortcomings inherent in the prior art devices and apparatuses noted above.

Briefly stated, the present invention contemplates the provision of a relatively compact, yet sturdily constructed, water level control device which may be readily attached to the side wall of a conventional aquarium tank. The device comprises an overflow receptacle or chamber which is adapted to be positioned within the interior of the aquarium tank. The overflow receptacle has an open top partially defined with a plurality of slots which extend vertically from the top edge of the overflow receptacle. Suspended on the exterior side of the aquarium tank wall adjacent overflow receptacle is a pre-filter receptacle. The pre-filter receptacle also has an open top and is provided with a vertical partition to define a pair of filter compartments arranged adjacent to each other. The common vertical partition wall extends from the bottom wall of the pre-filter receptacle to a horizontal plane vertically spaced intermediate the top and bottom of the prefilter receptacle. Both of the pre-filter compartments may be partially filled with suitable filter media and one of the compartments is also provided with a drain opening which is adapted to be in fluid communication with an external filter means. A siphon tube provides fluid communication between the overflow receptacle and the pre-filter receptacle not provided with the drain opening.

Preferably, the filtered water flowing from the external filter means passes to a filtered water reservoir. An electrically-driven driven pump is utilized to suck water from the reservoir and discharge the same into the aquarium tank.

In operation, the aquarium tank is filled with water to its normal level. As stated hereinbefore the overflow receptacle is designed and constructed so that the slot bottoms provided therein are disposed just below the surface of tank water when at its normal level. Prior to energizing the water pump, both the overflow receptacle and the water-receiving, pre-filter compartment not having the drain opening in the bottom thereof are filled with water to a level corresponding to the top edge of the partition wall separating the water-receiving and discharge pre-filter compartments. The siphon tube is then manually activated to initiate siphoning action and cause water to flow from the overflow receptacle to the water-receiving, pre-filter chamber in fluid communication therewith whenever the level of the water in the overflow receptacle is above the level of the water in the water-receiving, pre-filter compartment. Upon energization of the water pump, the water level in the aquarium tank will rise slightly and thus there will be a continuous flow of top surface water through the overflow receptacle slots as long as the water pump is in operation. Thus, the usual accumulation and concentration of proteins and other proteinaceous material on the top surface of the tank water will not occur as long as the pump is in operation. Water flows over the top edge of the partition wall from the water-receiving compartment to the discharge compartment where it drains to the filter unit.

An additional and important feature afforded by the present invention is the fact that in the event of a power failure or if the pump should malfunction and fail to pump sufficient water from the reservoir to the aquarium tank to effect a continuous flow of surface water to the overflow-receptacle, the water level will not be lowered below the bottoms of the overflow slots. Inasmuch as the level of the water in the overflow receptacle and water-receiving, pre-filter chamber is always at least as high as the top edge of the partition wall and since the inlet and outlet openings of the siphon tube are disposed below such top edge of the partition wall, the siphon action of the siphon tube is not destroyed or lost by failure of the pump to pump an adequate volume of water to the tank to ensure continuous flow of surface water to the overflow receptacle. Consequently, in order to put the water purifying and aeration system back in operation again, it is merely necessary to start the pump to cause surface water to again flow through the overflow receptacle slots. It is not necessary to manually activate the siphon tube since, as pointed out above, the siphon action is not effected by failure of the pump to operate properly.

Another important object of the present invention is the provision of a relatively compact, light-weight and portable, yet sturdily constructed, aquarium water level control device which has water purifying and aerating means embodied therein.

A further object is the provision of a unique combination aquarium water purifying, aerating and level control device which may be used in conjunction with any conventional aquarium tank without the necessity of modifying or altering the construction or structure of the tank in any manner.

Still another objective is the provision of a water level control device for aquariums and the like which functions to extract water and any foreign matter contained therein solely from the top surface of the body of water in the aquarium tank.

A still further object is the provision of a water level control device for an aquarium wherein a novel three step aerator means is incorporated therein.

Another objective of the present invention is the provision of a water level control device which not only accurately maintains a selected water level in an aquarium tank but also is effective to continually filter and aerate the aquarium water during operation.

The foregoing and other important objects and desirable features inherent in and encompassed by the invention, together with many of the purposes and uses thereof, will become readily apparent from a reading of the ensuing description in conjunction with the annexed drawings, in which:

DETAILED DESCRIPTION OF THE PREFERRED EMBODIMENT OF THE INVENTION

Figure 1:
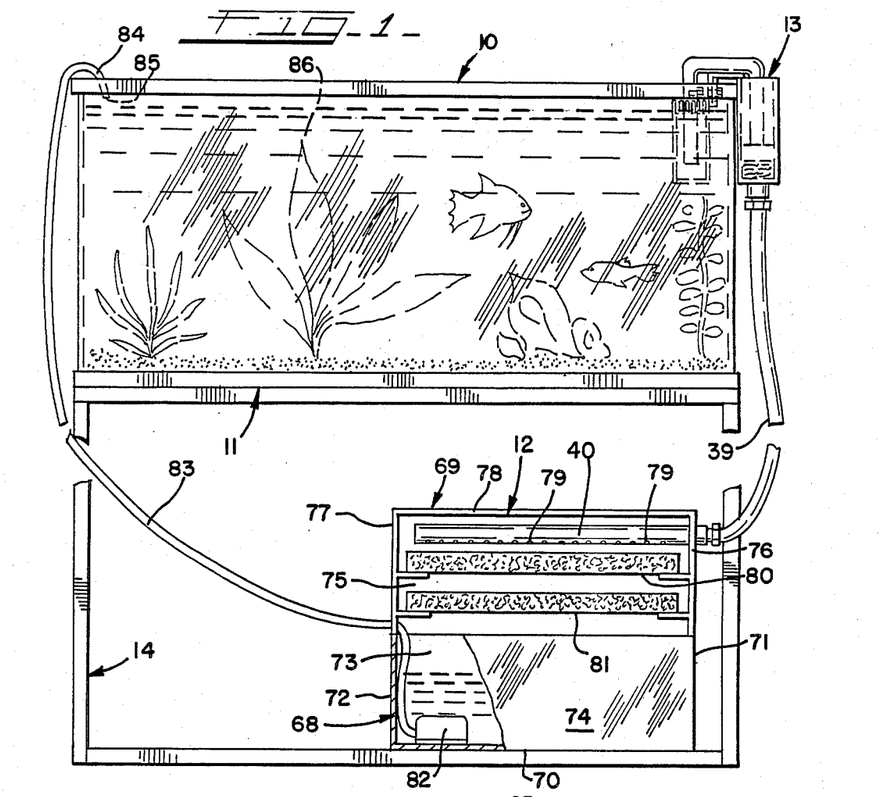
FIG. 1 is a side elevational view of an aquarium wherein a water level control device embodying the invention is incorporated therein, portions of the structure are shown in vertical section to better illustrate the operation of the water level control device.

Referring to the drawings in detail, wherein like reference characters represent like elements throughout the various views, reference character 10 is used to designate the aquarium structure in its entirety. The aquarium structure 10 includes an aquarium tank 11, an external filter means 12, and a water level control device, designated generally by reference character 13. Preferably, the aquarium tank 11 and the external filter means 12 are supported on a suitable stand 14 with aquarium tank 11 positioned above the external filter means 12, as shown in FIG. 1.

The tank 11 is conventional in every respect and, as such, is made of transparent material such as glass. The aquarium tank 11 is provided with water 15 as well as marine and plant life in a customary manner.

Figures 2, 3, 4:
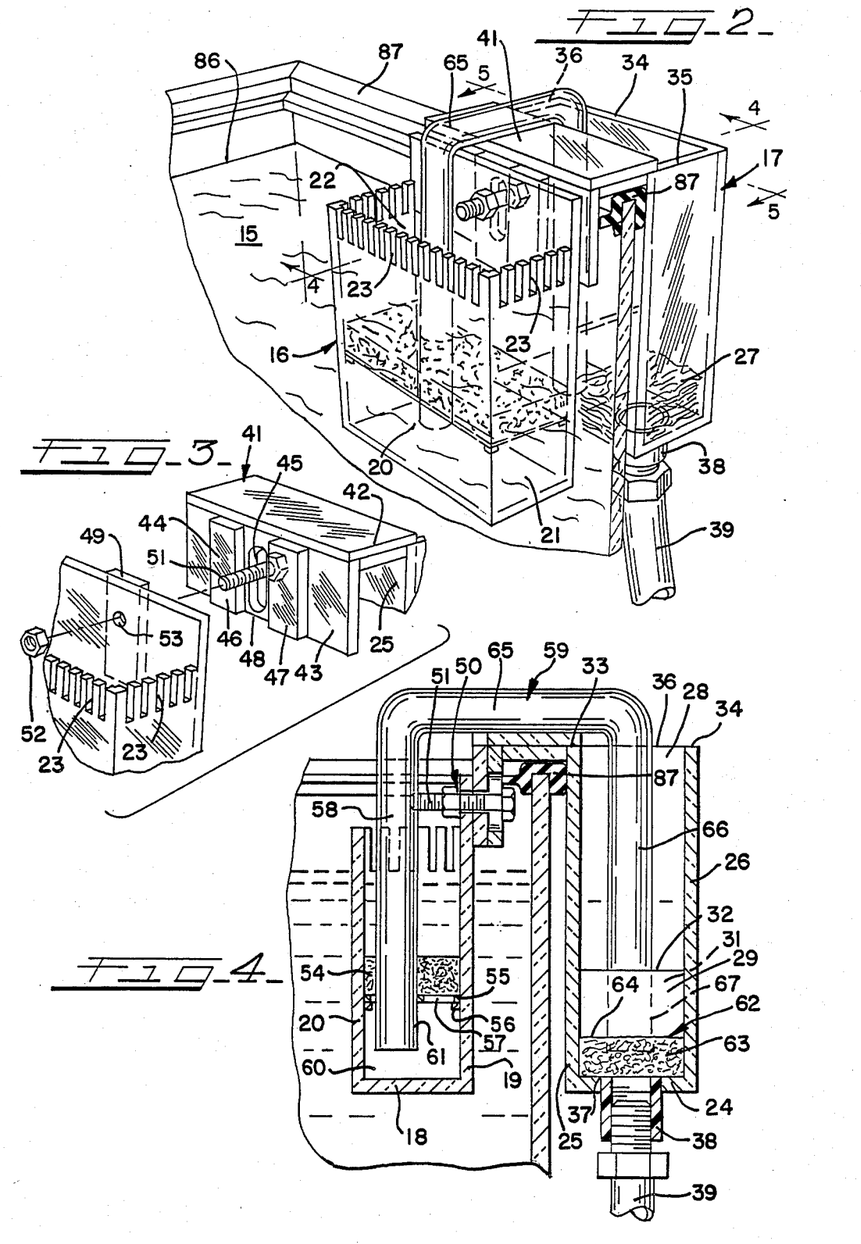
FIG. 2 is a fragmentary, perspective view of the water level control device shown in FIG. 1.
FIG. 3 is an enlarged, exploded view of the means for manually adjusting the maximum level of the aquarium water.
FIG. 4 is a vertical sectional view taken substantially along line 4—4 of FIG. 2.
Figure 5:
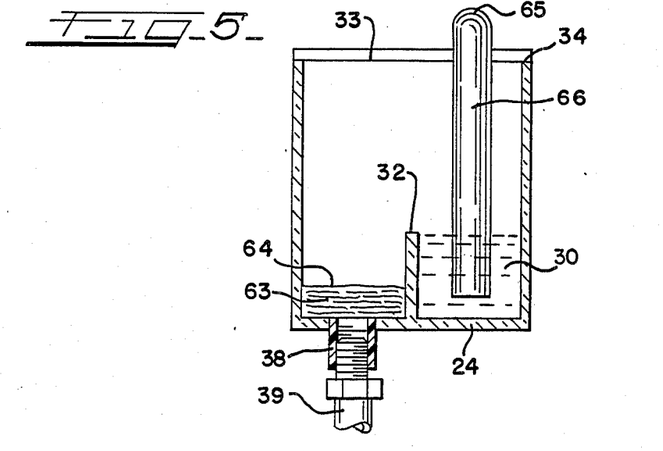
FIG. 5 is a vertical sectional view taken substantially along like 5—5 of FIG. 2.

The water level control device 13 of the present invention is preferably made of a clear or transparent, inert plastic material, such as acrylic. In essence, the water level control device 13 comprises a water overflow receptacle 16, and a prefilter receptacle 17. As best shown in FIGS. 2 and 4, the overflow receptacle 16 includes a generally rectangularly shaped bottom wall 18, a back wall 19, front wall 20 and end walls 21 and 22. The top edge portion of each of the side walls 21, 22 and front wall 20 is provided with a plurality of vertically disposed, narrow slots 23. It is to be understood that the width of each slot 23 is sufficiently large so as to permit the free passage of water and the foreign matter carried thereby from the interior of the aquarium tank to the interior of the overflow receptacle 16 but is small enough to prevent the passage of fish or other marine life therethrough. The purpose of the slots 23 and the manner in which they contribute to the achievement of the objects of the invention will be pointed out in detail presently.

The pre-filter receptacle 17, which is adapted to be disposed adjacent to the overflow receptacle 16 but on the exterior of the aquarium tank 11 when the water level control device 13 is in operation, includes a bottom wall 24, a back wall 25, a front wall 26, and side walls 27, 28. As best shown in FIG. 4, a partition wall 29 extends generally vertically from the bottom wall 24. The vertical height of the partition wall 29 is considerably smaller than the vertical height of the front wall 26, back wall 25, and side walls 27 and 28, for a purpose which will be apparent hereinafter. The partition wall 29, in effect divides the interior of the pre-filter receptacle 17 into two compartments arranged in a side-by-side relationship, namely, a water-receiving compartment 30 and a water-discharge or drainage compartment 31. From the foregoing, it will be appreciated that each of the water-receiving and water-discharge compartments 30, 31, respectively, is partially defined by the partition wall 29 and that the uppermost edge 32 of the partition wall 29 is vertically spaced a considerably greater distance from the top edges 33, 34, 35, 36 of the back, front, and side walls 25, 26, 27, 28 respectively, than from the bottom wall 24. It will also be noted that the vertical partition wall 29 is horizontally spaced closer to the side wall 27 than it is to the side wall 28 and, consequently, the interior volume of the water-receiving chamber 30 is larger than the interior volume of the water-discharge or drainage compartment 31.

As best shown in FIGS. 2 and 4, that portion of the bottom wall 24 defining the bottom of the water-drainage compartment is provided with drainage opening 37 into which an internally-threaded nipple 38 is suitably secured. The internally-threaded nipple 38 serves as a means for detachably connecting one end of a flexible drain tube or conduit 39 to the water drainage compartment 31. The opposite end of the drain tube 39 is detachably connected to one end of a spray bar 40 by any suitable conventional means.

The overflow receptacle 16 and pre-filter receptacle 17 are operatively interconnected by fabricated bracket means 41. The bracket means 41 has a generally inverted L-shaped configuration, as evidenced from viewing FIG. 4, with the horizontal leg portion 42 thereof fabricated from a pair of abutting, elongated plates. The vertical leg portion 43 of the bracket means 41 is in the form of an elongated, generally rectangular plate which is rigidly connected to and depends vertically from the horizontal leg portion 42. Similarly, the horizontal leg portion 42 is rigidly joined to the uppermost edge portion of the pre-filter receptacle back wall 25 in the vicinity of the top edge 33 thereof.

Although when being used to control the water level of the water level of the water in the aquarium tank 11, the vertical position of the overflow receptacle with respect to the pre-filter receptacle 17 is fixed, adjustment means designated generally by reference character 44, are provided for seelctively varying such relative vertical position relationship. The adjustment means 44 includes a vertically extending elongated slot 45 formed through the vertical leg portion 43 substantially midway between its longitudinal ends. The adjustment means 44 also includes a pair of substantially rectangularly shaped, vertical guide blocks 46, 47, each of which lies adjacent a respective side of the slot 45 and is rigidly secured to the outwardly facing side of the vertically depending leg portion 43. The vertical guide blocks 46, 47 partially define a guide channel 48 for slidingly receiving a generally rectangularly shaped guide bar 49. The guide bar 49 is rigidly connected to the outwardly facing side of the back wall 19 of the overflow receptacle 16. From the foregoing, it will be appreciated that when the guide bar 49 is disposed within the guide channel 48, the vertical position of the overflow receptacle 16 with respect to the vertical position of the pre-filter receptacle 17 may be varied but horizontal displacement of the overflow receptacle 17 relative to the pre-filter receptacle 17 is precluded. Clamp means 50, in the form of a threaded bolt 51 and cooperable nut 52, are used to secure the overflow-receptacle 16 in its adjusted position. As shown in FIG. 3, the bolt 51 is adapted to extend through the slot 45 and a bore 53 formed through the guide bar 49 and overflow receptacle back wall 19. From the foregoing, it will be appreciated that the vertical position of the overflow receptacle 16 with respect to the pre-filter receptacle 17 may be selected within a limited range defined by the vertical length of the slot 45. The importance of affording such adjustment of the overflow receptacle 16 will be pointed out hereinafter.

As pointed out hereinbefore, an important objective of the present invention is to generally provide aquarium water level control means which not only is capable of accurately maintaining a preselected, level ot water in the aquarium tank 11 but which is also effective to simultaneously subject the water to filtration and aeration processes. In order to achieve such objective, a layer or pad of filter media 54 of a suitable and well known kind, such as synthetic fiberous or sponge foam materials and the like, is positioned within the overflow receptacle 16. The filter media layer 54 is supported upon a suitable platform 55 constructed of plastic or like inert material. The platform 55 is provided with integrally formed, vertically depending leg means, designated generally by reference character 56, which are adapted to engage the bottom wall 18 and maintain the platform 55 vertically spaced above the bottom wall 18. The platform 55 has a multitude of relatively large area openings 57 formed therethrough which are of a size to readily permit the free and unimpeded passage of a generally vertically extending leg section 58 of an inverted U-shaped, tubular siphon tube designated generally by reference character 59, as well as the water flowing downwardly through the layer of filter media 54 therethrough. From the foregoing, it will be appreciated that the volume partially defined by the overflow receptacle bottom wall 18 and the platform 55 serves as a filtered water sump 60. It is also to be understood that the lowermost end portion 61 of the siphon tube leg section 58 is to be disposed within the filtered water sump 60 at all times during operation of the water level control device 13.

In addition to the water filtering means described above, a second water filtering means, designated generally by reference character 62, is provided in the pre-filter receptacle 17. The second water filtering means includes a pad or layer of filter media 63 which may be made of the same filter material as the layer or pad 54, described above. The filter pad or layer 63 is placed within the drainage compartment 31 and is supported directly upon the pre-filter receptacle bottom wall 24 over the drainage opening 37. Preferably, the vertical thickness of the filter layer 63 is such that the top surface 64 thereof is spaced vertically below the top edge 32 of the partition wall 29. From the foregoing, it will be appreciated that water flowing into the drainage compartment 31 passes through the filter media layer 54 by gravity and ultimately flows through the drainage opening 37.

Water is transferred from the overflow receptacle 16 to the pre-filter receptacle 17 by means of the siphoning action afforded by the siphon tube 59 alluded to hereinbefore. As pointed out previously, the siphon tube 59 has a generally inverted U-shape form and is preferably made of a rigid, as distinguished from flexible, plastic material. Also it is preferable for the efficient operation of the water level control device 13 that the internal diameter of the siphon tube 59 be the same as the internal diameter of the drain tube 39. The curved bight section 65 of the siphon tube 59 is adapted to rest upon and be supported by the bracket means 41, as shown in FIGS. 2 and 4. The siphon tube leg section 66 has a length substantially equal to the length of the siphon tube leg section 58 and depends vertically into the water-receiving compartment 30. The lowermost or discharge end 67 of the siphon tube leg section 66 is vertically spaced below the level of the top edge 32 of the partition wall 29 and vertically above the pre-filter receptacle bottom wall 24. It is important that the above-described positional relationship of the siphon tube discharge end 67 with respect to the level of the partition wall top edge 32 be maintained at all times for proper operation of the water level control device 13.

The external or outside filter means 12 comprises two main parts, namely, filtered water reservoir 68 and a filter housing 69. As illustrated in FIGS. 1, the reservoir 68 is supported by the stand 14 at an elevation considerably lower than the aquarium tank 11. The filter housing 69, in turn, is mounted on top of the reservoir 68.

The reservoir 68 is generally rectangularly shaped in plan and includes a flat bottom wall 70, a pair of spaced and parallel vertical end walls 71, 72, a vertical back wall 74, and a front wall (not illustrated). The top of the reservoir 68 is open to the atmosphere. The reservoir 68 contains a body of filtered water 74 for eventual use in the aquarium tank 11.

The filter housing 69, is essentially a covered, three-sided enclosure with an open bottom and an open front face. The filter housing 69 includes a vertical back wall 75 which has each of its vertical edges suitably joined to the edge of a respective one of a pair of spaced and substantially parallel vertical end walls 76, 77. As shown in FIG. 1, the length of the filter housing back wall 73 is substantially the same as the length of the reservoir back wall 73 and both back walls 73 and 75 lie substantially in a common vertical plane. The overall depth of the filter housing 69 is less than the overall depth of the filtered water reservoir 68 and, consequently, when the filter housing 69 is in its proper position above the reservoir 68 with their respective back walls 73 and 75 substantially in vertical alignment, a portion of the reservoir 68 remains uncovered to expose the body of the water 74 contained therein to the atmosphere.

As shown in FIG. 1, the spray bar 40, which is a conventional construction, extends horizontally through and is supported by the filter housing and wall 76 adjacent the filter housing top wall 78. The spray bar 40 is provided with a plurality of generally downwardly facing, horizontally spaced small openings 79 therein whereby the partially filtered water received from the drainage compartment 31 is cuased to be sprayed downwardly over a relatively large area within the filter housing 69.

The filter housing 69 is adapted to support a plurality of vertically spaced, generally flat filter media trays, two of which are shown in FIG. 1 and are identified respectively by reference characters 80 and 81. It is to be understood that the filter housing 69 could be designed to accomodate more than two trays without departing from the spirit and scope of the invention. While the trays 80, 81 are shown somewhat diagrammatically and constructional details are lacking, it is to be understood that each tray 80, 81 is generally rectangular in shape when viewed in plan and inlcudes a relatively thin and rigid, porous base plate which may be provided with a multitude of apertures (not shown) substantially throughout its entire surface area. Each of the trays 80, 81 is capable of supporting a layer of filter media, such as fiber, gravel, coral rubble, or any other non-toxic material that will tend to induce the development of aerobic bacteria. The trays 80, 81 are readily removable from the open front side of the filter housing 69 for routine maintenance or for other reasons. The water flowing from the spray bar 40 passes relatively freely through each of the stacked tray-supported filter media layers in sequence and eventually flows into the reservoir 68 to become part of the body of filtered water 74 held in the reservoir 68.

As shown in FIG. 1, an electrically-driven water pump 82 is positioned within the body of filtered water 74 contained in the reservoir 68 and is supported on the bottom wall 70 thereof. The submerged water pump 82, shown somewhat diagrammatically in FIG. 1, is operable to draw filtered water from the reservoir 68 and discharge the same under pressure to one end of a water return conduit 83, which may be in the form of a flexible plastic tube or the like. The water return tube 83 extends from the discharge side of the water pump 82 to the top of the aquarium tank 11. As illustrated in FIG. 1, the end of the water return tube 83 at the aquarium tank 11 is in the form of a hook or reversely bent section 84 whereby the water return tube 83 can be conveniently supported on one of the walls of the aquarium tank 11 with the discharge end of the water return tube 83 disposed within the interior of the aquarium tank. The entire top marginal edge of the aquarium tank is provided with a conventional plastic rim 87 and the reversely bent section 84 of the water return tube 83 is adapted to hook over and frictionally engage such plastic rim 87.

It is to be understood that while the reversely bent section 84 of the water return tube is shown supported by one of the end walls of the aquarium tank 11, it can be hooked over the other end wall or either of the two side walls of the aquarium tank 11 without departing from the spirit and scope of the invention. However, for reasons that will be pointed out hereinafter, it is important that the discharge end 85 of the water return tube 83 always be positioned at or vertically above the predetermined or preselected level 86 of water 15 contained within the aquarium tank 11 regardless of which aquarium tank wall is employed for supporting the uppermost end of the water return tube 83. Moreover, it is important that the above-noted spatial relationship of the discharge end 85 of the water return tube 83 and the predetermined or preselected aquarium water level 86 be maintained or fixed while the aquarium structure 10 is being used.

INITIAL INSTALLATION AND OPERATION

Initially, a determination is made as to the level of water 86 desired to be maintained in the aquarium tank 11 during operation of the same. Such predetermined water level 86 will generally correspond to the top surface of the body of water 15 contained in the aquarium tank 11 when it is filled to its designed maximum or full capacity. The water level control device 13 is then positioned on the plastic rim 87 portion of one of the aquarium tank walls as illustrated in FIGS. 2 and 4, with the overflow receptacle 16 disposed interiorly of the aquarium tank 11 adjacent the aquarium tank wall and the pre-filter receptacle 17 externally of the aquarium tank wall adjacent the same aquarium tank wall. As clearly shown in FIG. 4, the horizontal leg portion 42 of the bracket means 41 rests upon the rim 87. Thereafter, the clamp means 50, releasably securing the overflow receptacle 16 to the bracket means 41, is loosened by unthreading the nut 52. The entire overflow receptacle 13 is then adjusted vertically up or down until the horizontal plane containing the bottoms of the vertical extending slots 23 provided on the uppermost edge portions of the overflow receptacle front wall 20 and the end walls 21 and 22 approximates the predetermined level 86 of water 15 desired to be maintained in the aquarium tank 11. In actual practice the overflow receptacle 13 should be adjusted to a position wherein the horizontal plane containing the slot bottoms is slightly below the predetermined level of water 15 to compensate for the inherent restriction to the free flow of water due to the relatively narrow width of each slot 23. The nut 52 is threaded on the bolt 51 in order to firmly clamp the overflow receptacle 16 to the bracket means 41 in its adjusted position. From the foregoing, it will be appreciated that the predetermined water level 86 of the body of water 15 in the aquarium tank 11 can be actually varied a limited vertical distance corresponding to the length of the slot 45 provided in the bracket vertical leg portion 43. Thus the predetermined water level 86 of the body of water 15 contained within the aquarium tank 11 can be adjusted or changed at will as desired quickly and easily and, moreover, the adjustability feature allows the water level control device 13 to be used with a multitude of conventional aquarium tanks of a large variety of sizes and/or depths.

The overflow receptacle 16 and water-receiving compartment 30 are then each filled with water to a level corresponding to the top edge 32 of the partition wall 29. As evidenced from viewing FIG. 4, the sump pump 60 located in the bottom of the overflow receptacle 16, will be completely filled with water since the top of the sump 60 will always be below the level of the top edge 32 of the partition wall 29 regardless of the vertically adjusted position of the overflow receptacle 16 with respect to the pre-filter receptacle 17.

The siphon tube 59 is manually activated in a conventional manner and is positioned, as shown in FIG. 4, with its suction end 61 disposed within the sump 60 and its discharge end 67 vertically spaced below the level of the top edge 32 of the partition wall 29. Water obviously will not flow from the sump 60 to the water-receiving compartment 30 at this time since the level of water in the water-receiving compartment 30 and the suction and discharge ends 61 and 67, respectively, of the siphon tube 59 are disposed in a common horizontal plane. However, it will be appreciated, with the introduction of water into the overflow receptacle 16 of a quantity sufficient to cause the water level in the overflow receptacle 16 to rise above the level of the top edge 32 of the partition wall 29, the siphon tube 59 will commence transferring water immediately from the sump 60 to the water-receiving compartment 30.

The filtered water reservoir 68 is filled with a body of filtered, clean water 74 and, similarly, if the aquarium tank 11 has not already been initially supplied with water, it is filled with clean water 15 to a level corresponding to the horizontal plane containing the bottoms of the slots 23 formed in the upper marginal edge portions of the overflow receptacle 16, as pointed out hereinbefore which level, as pointed out hereinbefore, is slightly below the selected, predetermined level 86 in actual practice.

The pump 82 is then energized to effect a transfer of filtered water 74 from the reservoir 68 to the aquarium tank 11 through the tubular return conduit 83. Once the water level of the water in the aquarium tank 11, rises above the bottoms of the slots 23 slightly, it will commence to flow through the slots 23 and into the overflow receptacle 16. Inasmuch as the suction side of the pump 82 is submerged in water and not exposed to the atmosphere, the pump 82 is, in effect, self-priming. The importance of this feature will be appreciated presently. Conventional water pressure regulating means (not shown) may be employed for controlling the rate at which water flows from the discharge end 85 of the water return conduit or tube 83. It is desirable however, to have the water flow through the slots in a somewhat vigorous fashion in order to obviate the possibility of the slots becoming blocked or clogged by any foreign matter floating on the top surface 86 of the aquarium tank water 15 and passing through the slots 23. Moreover, it is desirable that water flow rate be adjusted so as to insure slight water turbulence as the water cascades over the front wall 20, and end walls 21, 22 of the overflow receptacle 16 to enhance aeration of the water. Inasmuch as the interior of the overflow receptacle is completely exposed to the atmosphere, the water continuously flowing through the slots 23 and over the overflow receptacle front and end walls 20, 21, 22, respectively, during operation of the aquarium structure 10 is efficiently and continually aerated. From the foregoing, it will be appreciated that by virtue of the structure described above, the undesirable solid foreign matter and dissolved proteinaceous material normally accumulated and concentrated on the top surface of aquarium water, are continually removed. The water level control device 13 is highly effective for drawing off aquarium tank top surface water and the foreign matter and dissolved proteinaceous material contained therein as well as for accurately maintaining a predetermined level 86 of the water 15 in the aquarium tank.

The water which flows into the overflow receptacle 16 ultimately percolates downwardly through the filter media 54 and into the sump 60 provided in the bottom of the overflow receptacle 16. As the water rises in the overflow receptacle 16 and exceeds the level of the water contained in the water-receiving compartment 30 of the pre-filter receptacle (which level corresponds to the horizontal plane containing the top edge 32 of the partition wall 29), the siphon tube 59 will commence transferring water from the sump 60 to the water-receiving compartment 30. Obviously, when such siphoning action starts, water will commence flowing from the water-receiving compartment 30, over the top edge 32 of the partition wall 29, and into the water discharge or drainage compartment 31 above the filter media 63. The water flowing into the water discharge or drainage compartment 31 percolates downwardly through the layer of filter media 63 retained in the drainage compartment 31 over the drainage opening 37. After passing through the layer of filter media 63, the water flows, by gravity, through the drainage tube 39 to the spray bar 40, located in the upper part of the filter housing 69. Inasmuch as the cross-sectional area of the drainage opening 37 is relatively large in comparison to the portion of the bottom wall 24 defining the bottom of the drainage compartment 31, the drainage compartment 31 tends to empty quickly. Moreover since the drainage compartment 31 is elevated above the spray bar 40 the water being emitted from the spray bar openings is under a small positive pressure. By causing the water to flow rapidly through the enlarged drainage openings 37 and tube 39, a small amount of turbulence is created at the drainage opening 37 to enhance aeration of the flowing water. Moreover, the relatively rapid flow of water into the large drainage opening 37 causes air to be sucked or aspirated into the water stream to further aerate the same.

From the foregoing, it will be appreciated that the water level control device 13 not only filters the aquarium water twice as it flows therethrough, as pointed out hereinbefore, but also serves to aerate same in three steps, i.e. as the water cascades into the overflow receptacle 16, as it flows over the top edge 32 of the partition wall 29, and as it flows into the enlarged drainage opening 37.

The prefiltered water flowing from the spray bar 40 seeps through the filter media supported by the upper and lower trays 80, 81, respectively, in sequence and eventually flows, by gravity, into the reservoir 68. While the water level control device 13 has been shown and described in conjunction with external filter means 12, it is to be understood that in certain installations, the amount of filtration and aeration of the aquarium water afforded by the water level control device 13 functioning alone may be adequate to insure proper environmental conditions for the aquarium fish, marine, and plant life. It will, therefore, by appreciated that the water level control device 13 may be used with an external filter means 12 of the kind briefly described herein or with any other known, so-called "outside", filter means, or may be used alone and constitute the sole means for filtering and aerating aquarium water in certain installations.

In the event of a power failure and the water pump 82 ceases to operate, the predetermined water level 86 in the aquarium tank 11 will be substantially maintained except for any loss of water due to evaporation. When such an eventuality occurs, the water levels in the overflow receptacle 16 and the water-receiving compartment 30 will be equalized by the siphoning action of the siphon tube 59, which equalized levels will correspond to the minimum level of the water always present in the water-receiving compartment 30. Since such minimum level of water corresponds to the level of the top edge 32 of the partition wall 29 and the lowermost ends 61,67 of siphon tube leg sections 58,66 respectively, are fixedly positioned below such level at all times, the siphon action is not broken by failure of the pump 82 to operate. Moreover, once power is restored the system will automatically restart. The water pump 82 is self-priming, as pointed out herebefore, and since the siphon action provided by the siphon tube 59 is never broken during the time the water pump 82 is stopped, re-energization of the water pump 82 automatically places the water level control device 13 in operation.

It will also be appreciated that the present invention allows the complete draining of the aquarium tank 11 for routine maintenance and cleaning or major repair without the need of manually starting the siphoning action of the siphon tube 59 once the aquarium tank 11 is again filled with water 15 to the predetermined water level 86.

The embodiment of the invention chosen for the purposes of description and illustration herein, is that preferred for achieving the objects of the invention and developing the utility thereof in the most desirable manner, due regard being had to existing factors of economy, simplicity of design and construction, manufacturing techniques and the improvements sought to be effected. It will be appreciated, therefore, that the particular structural and functional aspects emphasized herein are not intended to exclude, but rather to suggest, such other adaptations and modifications of the invention, as fall within the spirit and scope of the invention as defined in the appended claims.

What is claimed is:

1. Apparatus for incorporation into the recirculation water purifying system of an aquarium provided with a tank containing a body of water, the combination including said tank comprising:

means operable to continuously supply said tank with water;

water level control means for maintaining a predetermined level of water in said tank including an open-topped, overflow receptacle having water passageway means provided therein adjacent its open-topped end, a second open-topped receptacle having a partition wall extending vertically from the bottom thereof to divide the interior of said receptacle into a water-receiving compartment and a drainage compartment, the top edge of said partition wall lying generally in a horizontal plane vertically spaced intermediate the bottom and the open-topped end of said second receptacle, said water level control means including siphon tube means for transferring water from said overflow receptacle to said water-receiving compartment, the intake and discharge openings being vertically spaced below said horizontal plane containing said top edge of said partition wall;

mounting means for attaching said water control means to a wall of said tank to position said overflow receptacle interiorly of said tank with its open-topped end above said predetermined water level and said second receptacle exteriorly of said tank and generally horizontally adjacent to said overflow receptacle, said water passageway means being effective to permit the flow of surface water from said tank to said overflow receptacle whenever said water level exceeds said predetermined water level; and water drainage means in fluid communication with the interior of said drainage compartment for draining the same of water received therein from said water-receiving compartment by overflowing said top edge of said partition wall.

2. Apparatus for incorporation into the recirculating water purifying system of an aquarium as set forth in claim 1, wherein said water drainage means includes a drainage opening provided through a wall portion of the drainage compartment below the level of said top edge of said partition wall; and said drainage compartment has a layer of filter media disposed therein, said layer of filter media covering said drainage opening.

3. Apparatus for incorporation into the recirculating water purifying system of an aquarium as set forth in claim 2, wherein said siphon tube means includes a siphon tube having a generally inverted U-shaped configuration, the vertically depending legs extending, respectively, into said overflow receptacle and said water receiving compartment being substantially of the same length.

4. Apparatus for incorporation into the recirculating water purifying system for an aquarium as set forth in claim 3, wherein said overflow receptacle has a generally flat, rectangularly-shaped bottom wall, a front wall, a back wall, and a pair of side walls, and said water passageway means includes a plurality of slots formed in the top marginal edge portions of said front and side walls of said receptacle, said slots being arranged side-by-side and extending vertically from the top marginal edges of said front and side walls, the bottom of said slots all lying substantially in a common horizontal plane slightly below said predetermined level of water in said tank.

5. Apparatus for incorporation into the recirculating water purifying system of an aquarium as set forth in claim 4, wherein said second open-topped receptacle has a substantially flat, generally rectangularly-shaped bottom wall, a back wall, a front wall and a pair of side walls, said back, front, and side walls being substantially coextensive in length, and said partition wall extends horizontally from said back wall to said front wall and vertically from said bottom wall with the top marginal edge thereof vertically spaced below the top marginal edges of said back, front, and side walls of said second open-topped receptacle.

6. Apparatus for incorporation into the recirculating water purifying system of an aquarium as set forth in claim 5, wherein said means operable to continuously supply said tank with water includes a reservoir containing a body of filtered water, an electrically-driven water pump means having its suction side in fluid comunication with the body of water contained within said reservoir, and water conduit means extending between and providing fluid communication between the discharge side of said pump means and said tank.

7. Apparatus for incorporation into the recirculating water purifying system of an aquarium as set forth in claim 6, wherein said reservoir is spaced vertically below said drainage compartment; and said water drainage means in fluid communication with the interior of said drainage compartment for draining the same of water is also in fluid communication with said reservoir whereby water flows from the drainage compartment to said reservoir by gravity.

8. Apparatus for incorporation into the recirculating water purifying system of an aquarium provided with a tank containing a body of water, the combination as set forth in claim 7, wherein said mounting means for attaching said water control means to a wall of said tank includes a generally inverted L-shaped bracket means, the horizontal leg portion of said inverted L-shaped bracket emans operatively engaging the top marginal edge of tank wall and having its free edge rigidly connected to the top marginal edge of said second open-topped receptacle back wall, and manually operable vertical adjustment means for releasably securing said overflow receptacle back wall to the vertical leg portion of said inverted L-shaped bracket means, said adjustment means permitting the vertical relationship of said overflow receptacle with respect to said overflow receptacle to be varied.

9. Apparatus for incorporation into the recirculating water purifying system of an aquarium as set forth in claim 8, wherein said overflow receptacle has a layer of filter media disposed therein, said layer of filter media being vertically spaced between the bottom and open-topped end of said overflow receptacle.

10. Apparatus for incorporation in the recirculating water purifying system for an aquarium provided with a tank containing a body of water, the combination including said tank, comprising:

a reservoir positioned at a lower elevation than said tank containing a body of filtered water:

water level control means for maintaining a predetermined level of water in said tank including an open-topped, overflow receptacle having water passage slot means provided therein at the open-topped end thereof, a second open-topped receptacle having a generally flat bottom wall and a partition wall extending from said bottom wall to divide the interior of said receptacle into a water-receiving compartment and a drainage compartment, the top edge of said partition wall lying generally in a horizontal plane vertically spaced intermediate said bottom wall and the top marginal edges defining the open-topped end of said second receptacle, said water level control means including siphon tube means for transferring water from said overflow receptacle to said water-receiving compartment, the intake and discharge openings being vertically spaced below said top edge of said partition wall;

mounting means for attaching said water control means to a wall of said tank to position said overflow receptacle interiorly of said tank with its open-topped end above said predetermined water level and said second receptacle exteriorly of said tank and generally horizontally adjacent to said overflow receptacle, said slot means being effective to permit the flow of surface water and the foreign matter carried thereby from said tank to said overflow receptacle whenever said water level exceeds said predetermined water level;

means operable to continuously supply said tank with filtered water from said reservoir including a power-driven water pump means having its suction side in fluid communication with the interior of said reservoir below the top surface of the body of filtered water contained therein, and a water return tube having one end in fluid communication with the discharge side of said water pump means and its opposite, discharge end positioned within the interior of said tank:

external water filtration and aeration means including a housing positioned at a lower elevation than said tank, the interior of said housing being in fluid communication with the interior of said reservoir; and water drainage means providing fluid communication between the interior of said drainage compartment and the interior of said housing, said water drainage means being effective to drain, by gravity, water received in the drainage compartment from said water-receiving compartment by overflowing said top edge of said partition wall.

11. Apparatus for incorporation into the recirculating water purifying system for an aquarium as set forth in claim 10, wherein the portion of said flat bottom wall of said second receptacle defining the bottom of said drainage compartment is provided with a circular drain opening therethrough; and said water drainage means includes a tubular conduit having one end connected to said second compartment bottom wall portion at said drain opening.

12. Apparatus for incorporation into the recirculating water purifying system for aquarium as set forth in claim 11, wherein said drainage compartment has a layer of filter media disposed therein, said layer of filter media entirely covering said portion of said flat bottom wall of said second receptacle defining the bottom of said drainage compartment and the drain opening provided therethrough.

13. Apparatus for incorporation into the recirculating water purifying system of an aquarium as set forth in claim 12, wherein said siphon tube means includes a siphon tube having a generally inverted U-shaped configuration, the vertically depending legs extending, respectively, into said overflow receptacle and said water-receiving compartment being substantially of the same length.

14. Apparatus for incorporation into the recirculating water purifying system of an aquarium as set forth in claim 13, wherein said external filtration and aeration means includes a plurality of vertically spaced substantially flat trays removably supported within said housing, each of said trays carrying a layer of filter media thereon, said filtration and aeration means further including an elongated spray bar having a plurality of openings along its length, said spray bar being supported by said housing and being positioned above the uppermost one of said plurality of trays within said housing; and wherein one end of said tubular conduit of said water drainage means is operatively connected to one end of said spray bar whereby water being emitted from said spray bar openings flows through the filter media layers carried by said trays in sequence.

15. Apparatus for incorporation into the recirculating water purifying system of an aquarium as set forth in claim 14, wherein said external filtration and aeration means housing includes a vertical back wall spaced and substantially parallel to vertical end walls, and a horizontal top wall, said plurality of trays being supported by said housing end walls, said housing having an open front permitting removal and replacement of said trays from the front side of said housing.

16. Apparatus for incorporation into the recirculating water purifying system of an aquarium as set forth in claim 15, wherein said reservoir has an open top; and said external filtration and aeration means housing is supported by said reservoir with the lowermost one of said filter media carrying trays overlying the body of water contained in said reservoir.

17. Apparatus for incorporation into the recirculating water purifying system of an aquarium as set forth in claim 16, wherein the discharge opening of said water return tube disposed within the interior of said tank is vertically spaced above said predetermined water level of said water contained in said tank.

18. Apparatus for incorporation into the recirculating water purifying system for an aquarium as set forth in claim 17, wherein said overflow receptacle has a front wall, a back wall, and a pair of side walls, and said water passage slot means includes a plurality of slots formed in the top marginal edge portions of said front and side walls of said overflow receptacle, said slots being arranged side-by-side and extending vertically from the top marginal edges of said front and side walls, the bottoms of said slots all lying substantially in a common horizontal plane corresponding to said predetermined level of water in said tank.

19. Apparatus for incorporation into the recirculating water purifying system of an aquarium as set forth in claim 18, wherein said mounting means for attaching said water control means to a wall of said tank includes a generally inverted L-shaped bracket means operatively engaging the top marginal edge of said tank wall and having its free edge rigidly connected to said second open-topped receptacle at the uppermost end thereof, and manually operable vertical adjustment means for releasably securing said overflow receptacle back wall to the vertical leg portion of said inverted L-shaped bracket means, said adjustment means permitting the vertical relationship of said overflow receptacle with respect to said overflow receptacle to be varied.

20. Apparatus for incorporation into the recirculating water purifying system of an aquarium as set forth in claim 19, wherein said overflow has a generally flat, substantially rectangularly-shaped bottom wall, and has a layer of filter media disposed therein, said layer of filter media being vertically spaced below the open-topped end of said overflow receptacle.

21. Apparatus for incorporation into the recirculation water purifying system of an aquarium provided with a tank containing a body of water, the combination including said tank comprising;

means operable to continuously supply said tank with water:

water level control means for maintaining a predetermined level of water in said tank including an overflow receptacle fixedly positioned interiorly of said tank having water passageway means adjacent its uppermost end, said water passageway means being effective to permit the flow of surface water from said tank to said overflow receptacle whenever said water level exceeds said predetermined water level, a water-receiving compartment positioned exteriorly of said tank having a generally vertically disposed side wall portion partially defining the exterior wall surface of said compartment, the uppermost edge of said side wall portion lying generally in a horizontal plane vertically spaced below the top of said water-receiving compartment, and a water-drainage compartment positioned exteriorly of said tank, said side wall portion of said water-receiving compartment also partially defining the exterior wall surface of said water-drainage compartment, said water level control means including siphon tube means for transferring water from said overflow receptacle to said water-receiving compartment, the intake and discharge openings of said siphon tube means being vertically spaced below said horizontal plane containing said uppermost edge of said water-receiving compartment side wall portion; and means for draining said water-drainage compartment of water received therein from said water-receiving compartment by overflowing said uppermost edge of said water-receiving compartment side wall portion wherein the drainage means is in further fluid communication with a filtering means and said mans operable to continuously supply said tank for recirculating the water.

22. Apparatus for incorporation into the recirculation water purifying system of an aquarium as set forth in claim 21, wherein said means operable to continuously supply said tank with water includes a reservoir spaced vertically below said water-drainage compartment containing a body of water, power-driven water pump means having its suction side in fluid communication with the body of water contained within said reservoir and its discharge side in fluid communication with the interior of said tank; and said means for draining said water-drainage compartment includes water passageway means extending between and in fluid communication with said water-drainage compartment and said reservoir whereby water flows from said water drainage compartment to said reservoir by gravity.

* * * * *